July 5, 1927.
A. McKELLAR
MOWER
Filed Nov. 16, 1926
1,635,050
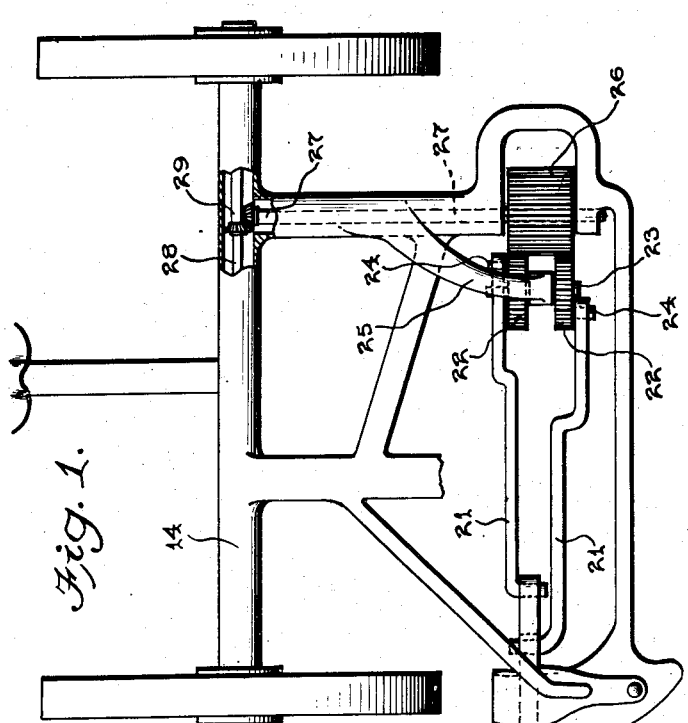
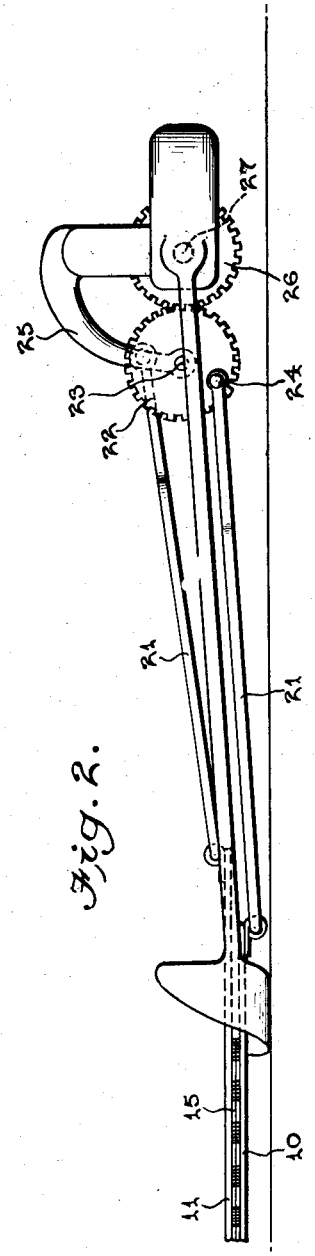
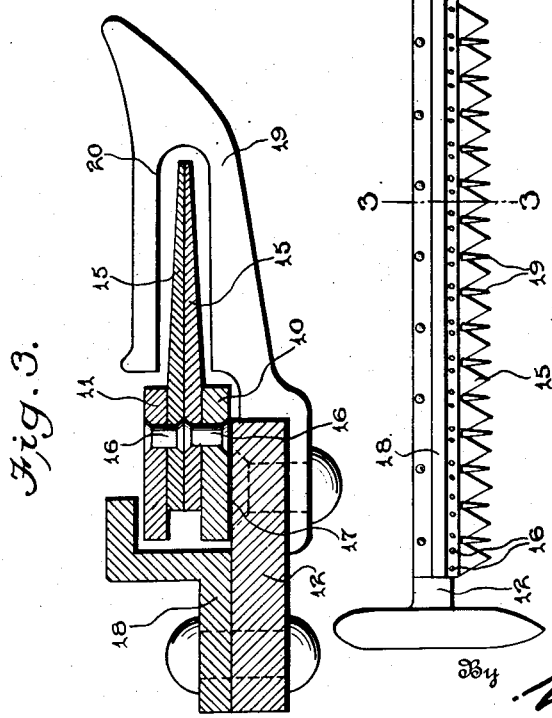
Inventor
Archie McKellar Patented July 5, 1927.

1,635,050

UNITED STATES PATENT OFFICE.

ARCHIE McKELLAR, OF WAUSAU, WISCONSIN.

MOWER.

Application filed November 16, 1926. Serial No. 148,652.

The object of the invention is to provide a mower in which the cutting operation is effected by cutter knives all of which move relatively to the finger bar, so that the shearing action more nearly simulates that of a pair of shears, thus providing for the more effective cutting of the grass or grain without any tendency to tear it off.

With this object in view, the invention consists in a construction and combination of parts of which a preferred embodiment is illustrated in the accompanying drawings, wherein:

Figure 1 is a top plan view of a mower embodying the invention, certain parts being broken away.

Figure 2 is a detail front elevational view of the inner ends of the cutter bars and the particular actuating means for the same.

Figure 3 is a transverse detail sectional view on the plane indicated by the line 3—3 of Figure 1.

The cutter bars 10 and 11 are disposed in superposed relation and slidably supported on the finger bar 12 carried by the frame 14 from which it projects laterally as in the usual construction. The cutter blades 15 are mounted respectively on the under face of the bar 11 and the upper face of the bar 12, being secured to the latter by fasteners 16, the heads of which are countersunk in the outer faces of the cutters, so that they may lie flush with said faces.

The cutter bar 10 rests upon the wear plate 17 carried by the finger bar 12 and may move longitudinally of the finger bar on the wear plate but is precluded from lateral movement on the rear by the guides 18 secured to the finger bar and on the front by the guard fingers 19. The cutter bar 11 is supported by its cutters 15 which are in close shearing contact with the cutters 15 on the bar 10, so that an effective shearing action may be accomplished by the cutters on the two bars as relative longitudinal movement in reverse directions is imparted to the bars.

The guides 18 and guard fingers 19 guide the upper cutter bar 11 laterally as is the case with the lower cutter bar and the guard fingers 19 are recessed in the usual manner, as indicated at 20, to provide clearance spaces for the cooperating cutters. The cutter bars 10 and 11 have the same longitudinal movement but are always moving in opposite directions, and in order that this may be accomplished, the inner ends of the bars are operatively connected by links 21 with the spur gears 22 mounted at opposite ends of a stub shaft 23. The gears 22 are fixed on said stub shaft and the connections between the links and the gear are by means of wrist pins 24 disposed eccentrically of the gears and having a relative angular displacement of one hundred and eighty degrees.

The stub shaft 23 is supported in a bearing at the extremity of an overhanging arm 25, the terminal portion of the arm being disposed between the two gears so that there may be no interference to the rotation of the wrist pins and the links connected therewith. The gears 22 are driven by a common gear 26 of approximately the same diameter, this gear being carried on a forwardly extending shaft 27 to which rotary motion is communicated from the axle 28 by a pair of bevel gears 29.

The stroke of the cutter bars 10 and 11 is equal to the spacing between the guard fingers 19. Thus, two cooperating blades on the two cutter bars, at the extremities of the strokes, register at the center line of the guard fingers. At the beginning of the next stroke, the relative positions of the bars and blades change and a different pair is brought into registration at a point intermediate the guard fingers which is the completion of a cutting operation, this being at the conclusion of half a stroke of the bars. During the following half stroke, the cutters are again separated until at the end of that stroke they are again in registration under the guard fingers preparatory to beginning a cutting operation in the opposite direction.

The invention having been described, what is claimed as new and useful is:

A mower comprising a frame having a finger bar extending laterally therefrom, cutter bars carried by the finger bar and arranged in superposed relation, the lower cutter bar being slidably supported on the finger bar and the upper cutter bar being slidably supported on the lower cutter bar, a driven shaft extending forwardly of the frame, a stub shaft paralleling said latter shaft and journaled in the extremity of an overhanging arm carried by the frame, spur gears carried at the extremities of the stub shaft and on opposite sides of said arm and provided with wrist pins disposed eccentrically of the gears and having a relative angular displacement of one hundred and eighty degrees, links connecting the wrist pins respectively with the cutter bars, and a gear carried by the first said shaft and meshing with said spur gears.

In testimony whereof he affixes his signature.

ARCHIE McKELLAR.